United States Patent
Xiang et al.

(10) Patent No.: US 12,189,574 B2
(45) Date of Patent: Jan. 7, 2025

(54) TWO-LEVEL LOGICAL TO PHYSICAL MAPPING MECHANISM IN A LOG-STRUCTURED FILE SYSTEM

(71) Applicant: VMware LLC, Palo Alto, CA (US)

(72) Inventors: Enning Xiang, San Jose, CA (US); Wenguang Wang, Santa Clara, CA (US); Abhay Kumar Jain, Cupertino, CA (US); Sriram Patil, San Jose, CA (US); Asit Desai, Cupertino, CA (US); Eric Knauft, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 74 days.

(21) Appl. No.: 17/504,845

(22) Filed: Oct. 19, 2021

(65) Prior Publication Data
US 2023/0123478 A1    Apr. 20, 2023

(51) Int. Cl.
*G06F 16/11* (2019.01)
*G06F 12/02* (2006.01)
*G06F 16/182* (2019.01)
*G06F 16/22* (2019.01)

(52) U.S. Cl.
CPC ........ *G06F 16/128* (2019.01); *G06F 12/0238* (2013.01); *G06F 16/1824* (2019.01); *G06F 16/2246* (2019.01); *G06F 2212/7201* (2013.01)

(58) Field of Classification Search
CPC .......................... G06F 16/128; G06F 16/2246
USPC ...................................................... 707/649
See application file for complete search history.

(56) References Cited

U.S. PATENT DOCUMENTS

| | | | |
|---|---|---|---|
| 2015/0248420 A1* | 9/2015 | Makkar | G06F 16/184 707/649 |
| 2017/0109385 A1* | 4/2017 | Aronovich | G06F 16/9027 |
| 2021/0349850 A1* | 11/2021 | Carey | G06F 16/182 |
| 2021/0406241 A1* | 12/2021 | Patel | G06F 16/128 |
| 2022/0138169 A1* | 5/2022 | Yelheri | G06F 3/065 707/695 |

OTHER PUBLICATIONS

Non-Published Commonly Owned U.S. Appl. No. 17/328,281, filed May 24, 2021, 27 pages, VMware.

* cited by examiner

*Primary Examiner* — Kuen S Lu
(74) *Attorney, Agent, or Firm* — King Intellectual Asset Managment

(57) ABSTRACT

Example methods and systems for accessing data in a log-structured file system having a plurality of snapshots of storage objects backed by a first-level copy-on-write (COW) B+ tree data structure and a plurality of second-level B+ tree data structures have been disclosed. One example method includes obtaining a first first-level mapping associated with a first snapshot from the plurality of snapshots based on a first logical block address, wherein each of the plurality of snapshots corresponds to each of the plurality of second-level B+ tree data structures, identifying a first second-level B+ tree data structure corresponding to one of the plurality of snapshots based on the first first-level mapping, obtaining a first second-level mapping based on the first logical block address in the first second-level B+ tree data structure, obtaining a first physical block address based on the first second-level mapping, and accessing data at the first physical block address.

20 Claims, 5 Drawing Sheets

210

| | Key | | Value | |
|---|---|---|---|---|
| | Snapshot ID | Logical block address | Middle Map Owner Root Node Address | NumBlks |
| 211 | Snapshot 1 | LBA1 | Physical address of root node of 302 | 1 |
| 213 | Snapshot 1 | LBA2 | Physical address of root node of 302 | 3 |
| 215 | Snapshot 1 | LBA10 | Physical address of root node of 302 | 1 |

220

| | Key | | Value | |
|---|---|---|---|---|
| | Snapshot ID | Logical block address | Middle Map Owner Root Node Address | NumBlks |
| 221 | Snapshot 2 | LBA1 | Physical address of root node of 302 | 1 |
| 223 | Snapshot 2 | LBA2 | Physical address of root node of 302 | 3 |
| 225 | Snapshot 2 | LBA10 | Physical address of root node of 304 | 1 |

230

| | Key | | Value | |
|---|---|---|---|---|
| | Snapshot ID | Logical block address | Middle Map Owner Root Node Address | NumBlks |
| 231 | Snapshot 3 | LBA1 | Physical address of root node of 302 | 1 |
| 233 | Snapshot 3 | LBA2 | Physical address of root node of 306 | 3 |
| 235 | Snapshot 3 | LBA10 | Physical address of root node of 304 | 1 |
| 237 | Snapshot 3 | LBA40 | Physical address of root node of 306 | 1 |

Fig. 2

TWO-LEVEL LOGICAL TO PHYSICAL MAPPING MECHANISM IN A LOG-STRUCTURED FILE SYSTEM

BACKGROUND

Unless otherwise indicated herein, the approaches described in this section are not admitted to be prior art by inclusion in this section.

Virtualization allows the abstraction and pooling of hardware resources to support virtual machines (VMs) in a virtualized computing environment. For example, through server virtualization, virtualization computing instances such as VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

In a distributed storage system, storage resources of a cluster of hosts may be aggregated to form a single shared pool of storage. VMs supported by the hosts within the cluster may then access the pool to store data. The data is stored and managed in a form of data containers called objects or storage objects. An object is a logical volume that has its data and metadata distributed in the distributed storage system. A virtual disk of a VM running on a host may also be an object and typically represented as a file in a file system of the host.

A log-structured file system (LFS) is a type of file system that can be deployed in such a virtualized computing environment. LFS writes data to physical storage sequentially in the form of an append-only log rather than performing in-place overwrites. This improves write performance by allowing small write requests to be batched into large sequential writes, but requires a segment cleaner that periodically identifies under-utilized segments on physical storage (i.e., segments with a large percentage of "dead" data blocks that have been superseded by newer versions) and reclaims the under-utilized segments by compacting their remaining live data blocks into other, empty segments.

Snapshotting is a storage feature that allows for the creation of snapshots, which are point-in-time read-only copies of storage objects such as files. Snapshots are commonly used for data backup, archival, and protection (e.g., crash recovery) purposes. Copy-on-write (COW) snapshotting is an efficient snapshotting implementation that generally involves (1) maintaining, for each storage object, a B+ tree (referred to as a "logical map") that keeps track of the storage object's state, and (2) at the time of taking a snapshot of the storage object, making the storage object's logical map immutable/read-only, designating this immutable logical map as the logical map of the snapshot, and creating a new logical map for the current (i.e., live) version of the storage object that includes a single root node pointing to the first level tree nodes of the snapshot's logical map (which allows the two logical maps to share the same logical block address (LBA)-to-physical block address (PBA) mappings).

For an LBS-based storage system that supports multiple snapshots, data blocks may be shared among such snapshots, leading to inefficiencies associated with tracking and updating PBAs of such shared data blocks. One approach of using a two-level mapping architecture in the LBS-based storage system that addresses such inefficiencies is disclosed in a commonly owned U.S. patent application Ser. No. 17/328,281, filed May 24, 2021 ("related patent application"). This related patent application is incorporated by reference herein. However, additional improvements are still needed to further enhance Input/Output (I/O) efficiencies and concurrent accesses to the middle map in the two-level mapping architecture in the LBS-based storage system.

BRIEF DESCRIPTION OF DRAWINGS

FIG. 2 illustrates tables with example key-value pairs for a first-level mapping mechanism, according to some embodiments of the disclosure;

DETAILED DESCRIPTION

Figure 1:
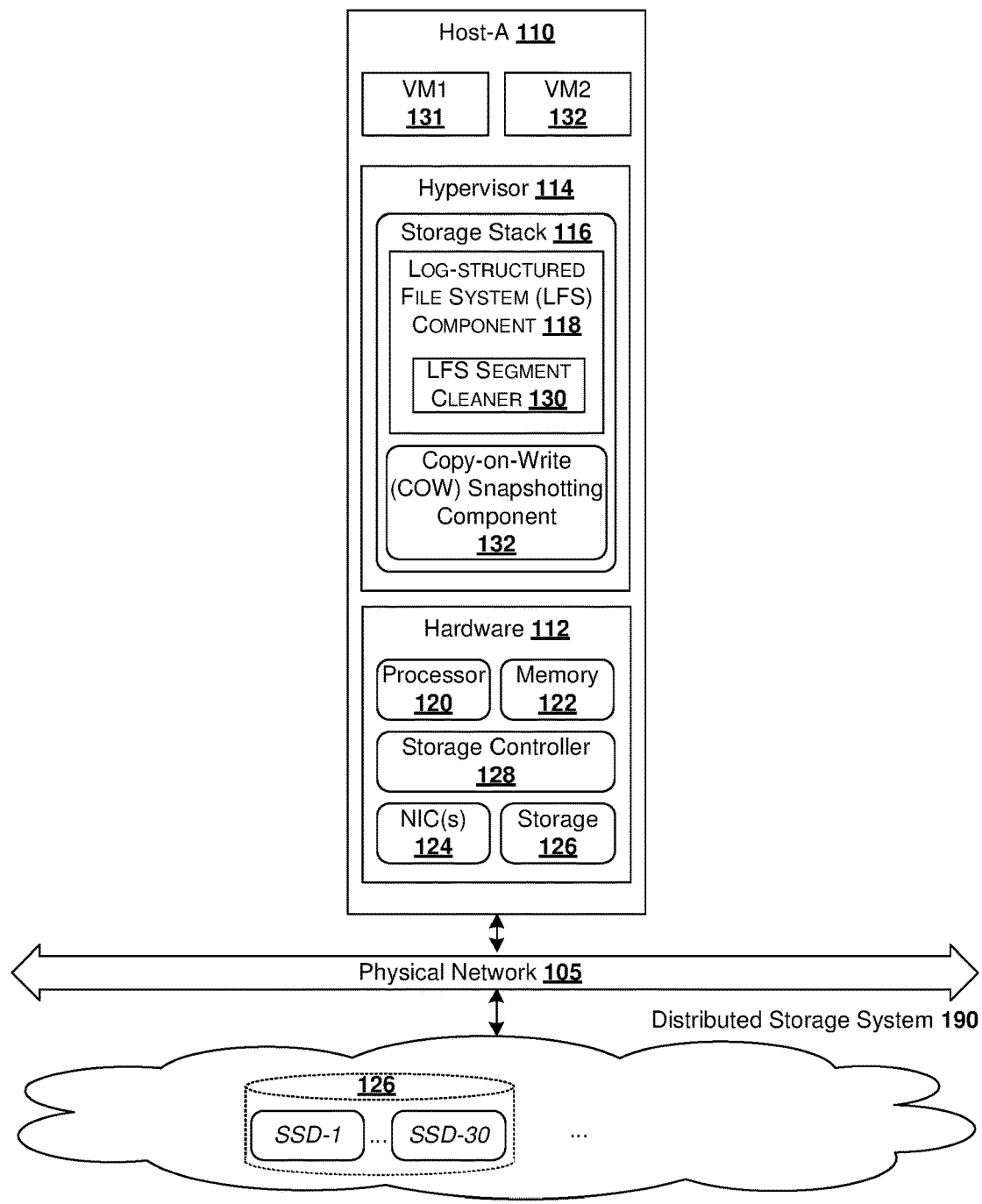
FIG. 1 is a schematic diagram illustrating an example virtualized computing environment that supports a log-structured file system, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. For example, a first element may be referred to as a second element, and vice versa.

FIG. 1 is a schematic diagram illustrating an example virtualized computing environment that supports a log-structured file system (LFS), according to one or more embodiments of the present disclosure. It should be understood that, depending on the desired implementation, virtualized computing environment 100 may include additional and/or alternative components than that shown in FIG. 1.

In the example in FIG. 1, virtualized computing environment 100 includes one or more hosts that are inter-connected via physical network 105. For simplicity, only host 110 is illustrated. Host 110 includes suitable hardware 112 and virtualization software (e.g., hypervisor-A 114) to support various virtual machines (VMs) 131 and 132. In practice, virtualized computing environment 100 may include any number of hosts (also known as a "host computers", "host devices", "physical servers", "server systems", "transport nodes," etc.), where each host may be supporting tens or hundreds of VMs.

It should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 114 may be implemented any suitable virtualization technology, such as VMware ESX® or ESXi™ (available from VMware, Inc.), Kernel-based Virtual Machine (KVM), etc. Hypervisor 114 may also be a "type 2" or hosted hypervisor that runs on top of a conventional operating system on host 110.

Hypervisor 114 maintains a mapping between underlying hardware 112 and virtual resources allocated to respective VMs 131 and 132. Hardware 112 includes suitable physical components, such as central processing unit(s) or processor(s) 120; memory 122; physical network interface controllers (NICs) 124; storage resource(s) 126, storage controller(s) 128 to provide access to storage resource(s) 126, etc. Virtual resources are allocated to each VM to support a guest operating system (OS) and applications (not shown for simplicity). For example, corresponding to hardware 112, the virtual resources may include virtual CPU, guest physical memory (i.e., memory visible to the guest OS running in a VM), virtual disk, virtual network interface controller (VNIC), etc.

In practice, storage controller 128 may be any suitable controller, such as redundant array of independent disks (RAID) controller (e.g., RAID-0 or RAID-1 configuration), etc. Host 110 may include any suitable number of storage resources in the form of physical storage devices, drives or disks. Each physical storage resource may be housed in or directly attached to host 110. Example physical storage resources include solid-state drives (SSDs), Universal Serial Bus (USB) flash drives, etc. For example, SSDs are gaining popularity in modern storage systems due to relatively high performance and affordability. Depending on the desired implementation, each SSD may include a high-speed interface connected to a controller chip and multiple memory elements.

To implement Software-Defined Storage (SDS) in virtualized computing environment 100, host 110 other hosts may be configured as a cluster. This way, all the hosts may aggregate their storage resources to form distributed storage system 190 that represents a shared pool of one or more storage resources 126. Distributed storage system 190 may employ any suitable technology, such as Virtual Storage Area Network (VSAN™) available from VMware, Inc. For example, host 110 and other hosts may aggregate respective storage resources into an "object store" (also known as a datastore or a collection of datastores). The object store represents a logical aggregated volume to store any suitable VM data relating to VMs 131-136, such as virtual machine disk (VMDK) objects, snapshot objects, swap objects, home namespace objects, etc. Any suitable disk format may be used, such as VM file system leaf level (VMFS-L), VSAN on-disk file system, etc. Distributed storage system 190 is accessible by hosts 110 via physical network 105.

In some embodiments, hypervisor 114 supports storage stack 116, which processes I/O requests that it receives. Storage stack 116 may include LFS component 118 (with an LFS segment cleaner 130) and copy-on-write (COW) snapshotting component 132. LFS component 118 is configured to manage the storage of data in distributed storage system 190 and write data modifications to distributed storage system 190 in a sequential, append-only log format. LFS component 108 can also accumulate multiple small write requests directed to different LBAs of a storage object in an in-memory buffer and, once the buffer is full, write out all of the accumulated write data (collectively referred to as a "segment") via a single, sequential write operation.

To ensure that distributed storage system 190 has sufficient free space for writing new segments, LFS segment cleaner 130 periodically identifies existing segments on disk(s) that have become under-utilized due to the creation of new, superseding versions of the logical data blocks in those segments. The superseded data blocks are referred to as dead data blocks. LFS segment cleaner 130 then reclaims the under-utilized segments by copying their remaining live data blocks in a compacted form into one or more empty segments, which allows the under-utilized segments to be deleted and reused.

COW snapshotting component 132 of storage stack 116 is configured to create snapshots of the storage objects supported by distributed storage system 190 by manipulating, via a copy-on-write mechanism, logical maps that keep track of the storage objects' states.

One known two-level mapping architecture in an LBS-based storage system includes two separate B+ tree data structures: a first-level COW B+ tree data structure that supports logical maps of storage objects' snapshots and a first set of mapping relationships and a second-level single B+ tree data structure, referred to as a "middle map" or "intermediate map" that supports a second set of mapping relationships. Specifically, extents (contiguous area of storage, represented as range of address block numbers) owned or shared by all the snapshots, including the current or live storage object (also referred as the "running point"), are placed into the same middle map. If the extents of a particular snapshot need to be deleted, the middle map needs to be locked at the time of the deletion. Other workloads such as write I/Os of the running point also need to lock the middle map to update the state information of the middle map. Concurrent workloads accessing the same middle map may cause contention, leading to latency and performance degradation issues.

To address at least the foregoing challenges, in some embodiments, one approach is to divide the single middle map into multiple B+ tree data structures (also referred to as a "forest"). Each snapshot that owns middle extents has its own corresponding middle map. Extents are "owned" by the snapshot if such extents were created when the snapshot was the running point at the time. The middle map continues to exist as long as its extents are still referred by the logical map of any snapshot even if the original owner snapshot is deleted. By having these independent B+ tree data structures, the snapshot deletion workload does not impact the middle map of the running point, which may be a critical resource affecting the performance of the system.

In some embodiments, storage stack 116 may be configured to support a two-level logical to physical mapping mechanism that utilizes the following schema for the logical map and middle maps:

[Key: LBA -> Value: Middle Map Owner Root Node Address, numBlocks]
Logical Map Schema
[Key: LBA -> Value: PBA, numBlocks]
Middle Map Schema Here, the two-level mapping mechanism refers to a per-object/snapshot logical map with the aforementioned logical map schema as the first level and a per-object middle map with the aforementioned middle map schema as the second level.

By dividing a large single middle map into multiple smaller middle maps, the size of the key field (i.e., having just LBA) and the size of the value field are also reduced, resulting in the reduction of the depth of the middle map and the increase of the fan-out of the B+ tree data structures. As an example, the LBA in the key field may occupy 5 bytes (40 bits). Correspondingly, I/O cost and computing cost are reduced for the foreground running point read/write workload, leading to improvement in the overall system performance.

Based on the schema above, FIG. 2 illustrates tables with example key-value pairs for a first-level mapping mechanism, according to some embodiments of the disclosure.

In some embodiments, table 210 includes mapping relationships such as mappings 211, 213 and 215 between a plurality of LBAs in a logical map of snapshot 1 backed by a first-level COW B+ tree data structure and a physical address of the root node of a first second-level B+ tree data structure corresponding to a first storage object associated with snapshot 1. In some embodiments, mappings 211, 213 and 215 represent a set of key-value pairs.

Figure 3A:
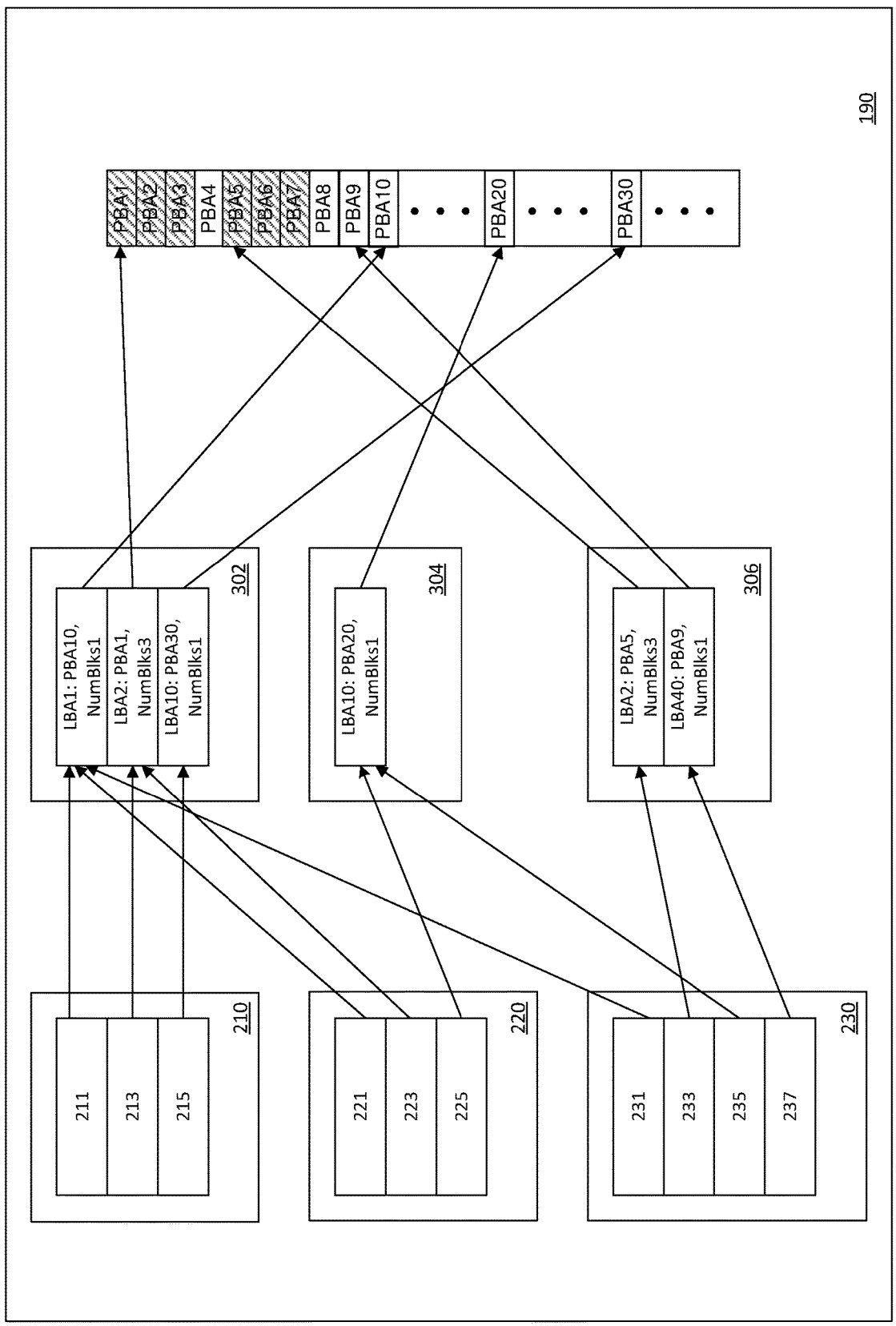
FIG. 3A is a block diagram illustrating a two-level logical to physical mapping mechanism, according to some embodiments of the disclosure, according to one or more embodiments of the present disclosure.
Figure 3B:
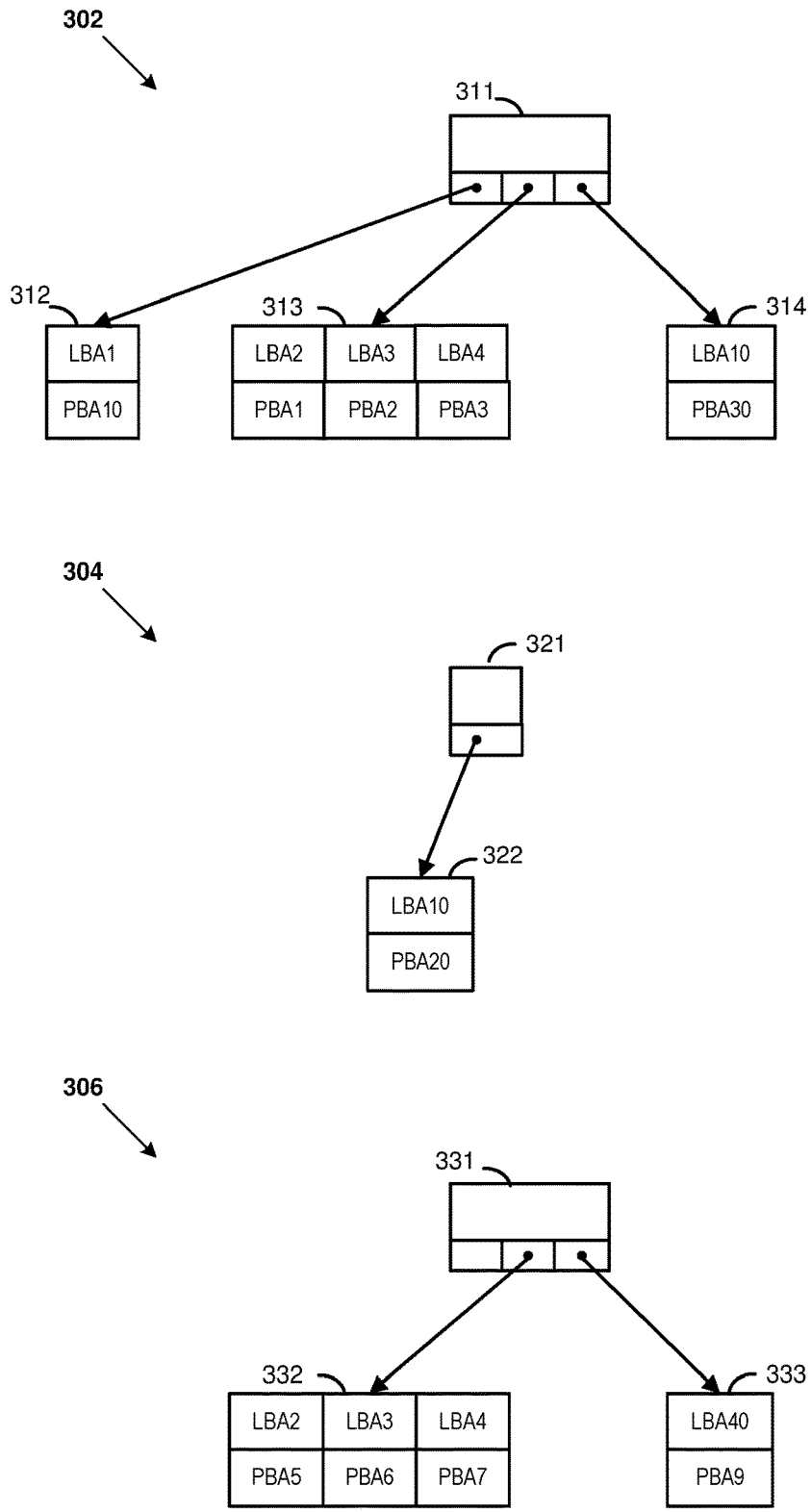
FIG. 3B illustrates a plurality of second-level B+ tree data structures corresponding to the middle maps of FIG. 3A in a second-level mapping mechanism, according to one or more embodiments of the present disclosure.

For example, in mapping 211, "LBA1," "physical address of root node of 302" and "NumBlks1" are a key-value pair in which "LBA1" is the key, and the "physical address of root node of 302" and "NumBlks1" are values of the key-value pair. An example of second-level B+ tree data structure (or middle map) 302 is shown in FIG. 3A and FIG. 3B. An example root node of middle map 302 is illustrated as root node 311 in FIG. 3B. "LBA1" refers to the LBA being 1, and "NumBlks1" refers to a contiguous 1 data block from LBA1.

Similarly, in mapping 213, "LBA2," "physical address of root node of 302" and "NumBlks3" are a key-value pair. "LBA2" refers to the LBA being 2, and "NumBlks3" refers to contiguous 3 data blocks from LBA2.

In mapping 215, "LBA10," "physical address of root node of 302" and "NumBlks1" are a key-value pair. "LBA10" refers to the LBA being 10, and "NumBlks1" refers to a contiguous 1 data block from LBA10. It should be noted that all three LBAs of snapshot 1 are mapped to the same root node 311 of the same middle map 302.

In some embodiments, table 220 includes mappings 221, 223 and 225 between a plurality of LBAs in a logical map of a different snapshot, snapshot 2, backed by the same first-level COW B+ tree data structure and physical addresses of the root nodes of both the first second-level B+ tree data structure corresponding to the first storage object associated with snapshot 1 (i.e., middle map 302) and a second second-level B+ tree data structure corresponding to a second storage object associated with snapshot 2 (i.e., middle map 304). Specifically, in mappings 221 and 223, the middle map owner root node address is the physical address of root node of middle map 302. In mapping 225, the middle map owner root node address is the physical address of root node of middle map 304. In other words, in conjunction with FIG. 3B, mappings 221 and 223 include the physical address of root node 311, and mapping 225 includes the physical address of root node 321.

In some embodiments, table 230 includes mappings 231, 233, 235 and 237 between a plurality of LBAs in a logical map of snapshot 3 still backed by the same first-level COW B+ tree data structure and physical addresses of the root nodes of three different second-level B+ tree data structure, i.e., middle map 302, middle map 304, and a third second-level B+ tree data structure corresponding to a third storage object associated with snapshot 3 (i.e., middle map 306). Specifically, in mappings 231, the middle map owner root node address is the physical address of root node of middle map 302. In mappings 235, the middle map owner root node address is the physical address of root node of middle map 304. In mapping 233 and 237, the middle map owner root node address is the physical address of root node of middle map 306. In other words, in conjunction with FIG. 3B, mapping 231 includes the physical address of root node 311, mapping 235 includes the physical address of root node 321, and mappings 233 and 237 include the physical address of root node 331.

FIG. 3A is a block diagram illustrating a two-level logical to physical mapping mechanism, according to some embodiments of the disclosure.

As discussed above in conjunction with FIG. 2, the first-level mapping mechanism includes mappings 211, 213 and 215 in table 210; 221, 223 and 225 in table 220; and 231, 233, 235 and 237 in table 230.

In some embodiments, the second-level mapping mechanism includes middle maps 302, 304, and 306, which correspond to tables 210 (snapshot 1), 220 (snapshot 2), and 230 (snapshot 3), respectively. Entries in each middle map may be shared by multiple entries in the first level. For example, as shown in FIG. 3A, mapping 211 of snapshot 1, mapping 221 of snapshot 2, and mapping 231 of snapshot 3 share the key-value pair of <LAB1: PBA10> in middle map 302. Mapping 213 of snapshot 1 and mapping 223 of snapshot 2 share the key-value pair of <LB2: PBA1, NumBlks3> in middle map 302. Mapping 225 of snapshot 2 and mapping 235 of snapshot 3 share the key-value pair of <LBA10: PBA 20> in middle map 304.

FIG. 3B illustrates a plurality of second-level B+ tree data structures corresponding to the middle maps of FIG. 3A in a second-level mapping mechanism, according to some embodiments of the disclosure. In some embodiments, middle map 302 includes root node 311 and leaf nodes 312, 313 and 314; middle map 304 includes root node 321 and leaf node 322; and middle map 306 includes root node 331 and leaf nodes 332 and 333.

In some embodiments, in middle map 302, leaf node 312 maintains a key-value pair<LBA1:PBA10, NumBlks1> in which "LBA1" is the key of the pair and "PBA10" and "NumBlks1" are values of the pair. "LBA1" refers to the LBA being 1. "PBA10" refers to the PBA being 10. With "NumBlks1," LBA1 corresponds to PBA10.

Similarly, in some embodiments, leaf node 313 maintains a key-value pair<LBA2:PBA1, NumBlks3> in which "LBA2" is the key of the pair and "PBA1" and "NumBlks3" are the values of the pair. "LBA2" refers to the LBA being 2. "PBA1" refers to the PBA being 1. With "NumBlks3," 3 contiguous data blocks from LBA2 (i.e., LBA2-4) correspond to 3 contiguous data blocks from PBA1 (i.e., PBA1-3).

In some embodiments, leaf node 314 maintains a key-value pair<LBA10:PBA30, NumBlks1> in which "LBA10" is the key of the pair and "PBA30" and "NumBlks1" are the values of the pair. "LBA10" refers to the LBA being 10. "PBA30" refers to the PBA being 30. With "NumBlks1," LBA10 corresponds to PBA30.

In some embodiments, in middle map 304, leaf node 322 maintains a key-value pair<LBA10:PBA20, NumBlks1> in which "LBA10" is the key of the pair and "PBA20" and "NumBlks1" are the values of the pair. "LBA10" refers to the LBA being 10. "PBA20" refers the PBA being 20. With "NumBlks1," LBA10 corresponds to PBA20.

In some embodiments, in middle map 306, leaf node 332 maintains a key-value pair<LBA2:PBA5, NumBlks3> in which "LBA2" is the key of the pair and "PBA5" and "NumBlks3" are the values of the pair. "LBA2" refers to the LBA being 2. "PBA5" refers the PBA being 5. With "NumBlks3," 3 contiguous data blocks from LBA2 (i.e., LBA2-4) correspond to 3 contiguous data blocks from PBA5 (i.e., PBA5-7).

Similarly, in some embodiments, leaf node 333 maintains a key-value pair<LBA40:PBA9, NumBlks1> in which "LBA40" is the key of the pair and "PBA9" and "NumBlks1" are the values of the pair. "LBA40" refers to the LBA being 40. "PBA9" refers to the PBA being 9. With "NumBlks1," LBA40 corresponds to PBA9.

Figure 4:
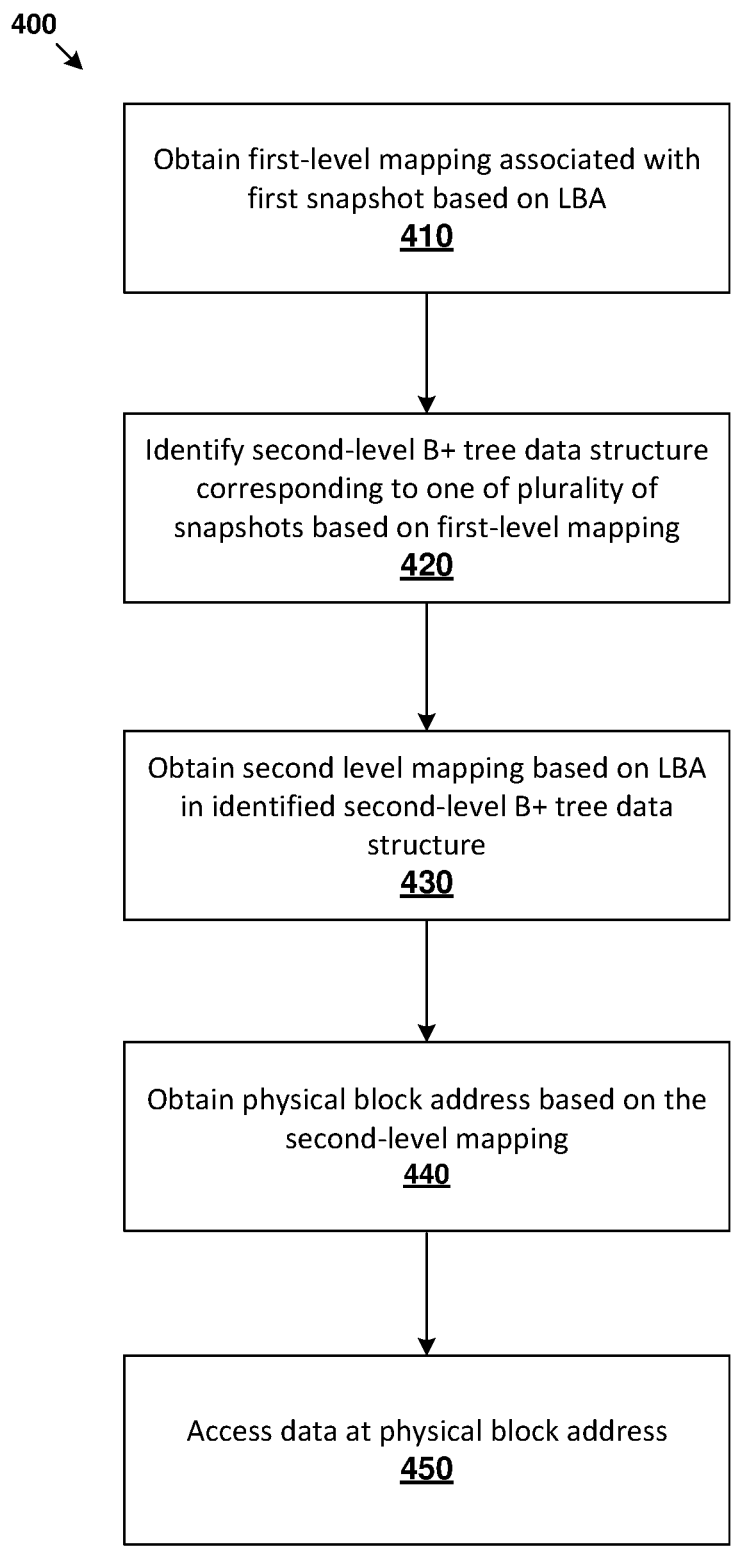
FIG. 4 is a flow diagram of an example process for performing a two-level logical to physical address mapping to access data in a log structured file system, according to one or more embodiments of the present disclosure.

FIG. 4 is a flow diagram of an example process 400 for performing a two-level logical to physical address mapping to access data in a log structured file system, according to one or more embodiments of the present disclosure. Example process 400 may include one or more operations, functions, or actions illustrated by one or more blocks, such as 410 to 440. The various blocks may be combined into fewer blocks, divided into additional blocks, and/or eliminated depending on the desired implementation. In some embodiments, process 400 may be performed by storage stack 116 illustrated in FIG. 1.

Process 400 may start with block 410 "obtain first-level mapping associated with first snapshot based on LBA." For example, in conjunction with FIG. 2, in block 410, first-level mapping 215 for snapshot 1 is obtained based on "LBA10" as the key value in the key-value pair of <LBA10: physical address of root node of 302, NumBlks1>. Block 410 may be followed by block 420 "identify second-level B+ tree data structure corresponding to one of plurality of snapshots based on first-level mapping."

In some embodiments, in block 420, based on the value of "physical address of root node of 302" (i.e., physical address of root node 311 shown in FIG. 3B) in the key-value pair of <LBA10: physical address of root node of 302, NumBlks1>, a second-level B+ tree data structure associated with snapshot 1 (i.e., middle map 302) is identified. Block 420 may be followed by block 430 "obtain second level mapping based on LBA in identified second-level B+ tree data structure."

In some embodiments, in block 430, by using the same "LBA10" as the key, a second-level mapping (i.e., the key-value pair of <LBA10: PBA30, NumBlks1>) in the identified middle map 302 is obtained. Block 430 may be followed by block 440 "obtain physical block address based on the second-level mapping."

In some embodiment, in block 440, "PBA30" in the key-value pair of <LBA10: PBA30, NumBlks1> is obtained.

In some embodiments, in block 450, data at PBA30 is accessed after having gone through the two-level mapping mechanism.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 4. For example, a computer system capable of acting as host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method comprising:
   obtaining a first first-level mapping associated with a first snapshot, of a plurality of snapshots of storage objects backed by a first-level copy-on-write (COW) B+ tree data structure and a plurality of second-level B+ tree data structures, based on a first logical block address, wherein each of the plurality of snapshots corresponds to one of the plurality of second-level B+ tree data structures;
   obtaining a second first-level mapping associated with a second snapshot from the plurality of snapshots based on a second logical block address;
   in response to a determination that the first logical block address and the second logical block address are the same, identifying a first second-level B+ tree data structure from the plurality of second-level B+ tree data structures, which corresponds to one of the plurality of snapshots, based on the second first-level mapping;
   obtaining a first second-level mapping based on the second logical block address in the first second-level B+ tree data structure;
   obtaining a first physical block address based on the first second-level mapping; and
   accessing data at the first physical block address.

2. The method of claim 1, wherein the first first-level mapping represents a key-value pair, and the key includes the first logical block address, and the values include a physical address of a root node of the first second-level B+ tree data structure and a number of contiguous data blocks from the first logical block address.

3. The method of claim 1, wherein the first second-level mapping represents a key-value pair, and the key includes the first logical block address and the values include the first physical block address and a number of contiguous logical data blocks from the first logical block address.

4. The method of claim 1, wherein the first second-level B+ tree data structure corresponds to the first snapshot.

5. The method of claim 1, further comprising:
   identifying a second second-level B+ tree data structure corresponding to one of the plurality of snapshots based on the second first-level mapping;
   obtaining a second second-level mapping based on the second logical block address in the second second-level B+ tree data structure;
   obtaining a second physical block address based on the second second-level mapping;
   and accessing data at the second physical block address.

6. The method of claim 1, wherein accessing data comprises accessing data in a log-structured file system (LFS).

7. The method of claim 6, wherein the LFS is implemented in a virtualized computing environment.

8. A non-transitory computer-readable storage medium that includes a set of instructions which, in response to execution by a processor of a computer system, cause the processor to perform operations comprising:
   obtaining a first first-level mapping associated with a first snapshot, of a plurality of snapshots of storage objects backed by a first-level copy-on-write (COW) B+ tree data structure and a plurality of second-level B+ tree data structures, based on a first logical block address, wherein each of the plurality of snapshots corresponds to one of the plurality of second-level B+ tree data structures;
   obtaining a second first-level mapping associated with a second snapshot from the plurality of snapshots based on a second logical block address;
   in response to a determination that the first logical block address and the second logical block address are the same, identifying a first second-level B+ tree data structure from the plurality of second-level B+ tree data structures, which corresponds to one of the plurality of snapshots, based on the first second first-level mapping;
   obtaining a first second-level mapping based on the second logical block address in the first second-level B+ tree data structure;
   obtaining a first physical block address based on the first second-level mapping; and
   accessing data at the first physical block address.

9. The non-transitory computer-readable storage medium of claim 8, wherein the first first-level mapping represents a key-value pair, and the key includes the first logical block address, and the values include a physical address of a root node of the first second-level B+ tree data structure and a number of contiguous data blocks from the first logical block address.

10. The non-transitory computer-readable storage medium of claim 8, wherein the first second-level mapping represents a key-value pair, and the key includes the first logical block address and the values include the first physical block address and a number of contiguous logical data blocks from the first logical block address.

11. The non-transitory computer-readable storage medium of claim 8, wherein the first second-level B+ tree data structure corresponds to the first snapshot.

12. The non-transitory computer-readable storage medium of claim 8, including additional instructions which, in response to execution by the processor of the computer system, cause the processor to:
   identify a second second-level B+ tree data structure corresponding to one of the plurality of snapshots based on the second first-level mapping;
   obtain a second second-level mapping based on the second logical block address in the second second-level B+ tree data structure;
   obtain a second physical block address based on the second second-level mapping; and
   access data at the second physical block address.

13. The non-transitory computer-readable storage medium of claim 8, wherein accessing data comprises accessing data in a log-structured file system (LFS).

14. The non-transitory computer-readable storage medium of claim 13, wherein the LFS is implemented in a virtualized computing environment.

15. A computer system comprising:
   a processor; and
   a non-transitory computer-readable medium having stored thereon instructions that, when executed by the processor, cause the processor to:
      obtain a first first-level mapping associated with a first snapshot, of a plurality of snapshots of storage objects backed by a first-level copy-on-write (COW) B+ tree data structure and a plurality of second-level B+ tree data structures, based on a first logical block address, wherein each of the plurality of snapshots corresponds to one of the plurality of second-level B+ tree data structures;

obtain a second first-level mapping associated with a second snapshot from the plurality of snapshots based on a second logical block address;

in response to a determination that the first logical block address and the second logical block address are the same, identify a first second-level B+ tree data structure from the plurality of second-level B+ tree data structures, which corresponds to one of the plurality of snapshots, based on the first-second first-level mapping;

obtain a first second-level mapping based on the second logical block address in the first second-level B+ tree data structure;

obtain a first physical block address based on the first second-level mapping; and access data at the first physical block address.

16. The computer system of claim 15, wherein the first first-level mapping represents a key-value pair, and the key includes the first logical block address, and the values include a physical address of a root node of the first second-level B+ tree data structure and a number of contiguous data blocks from the first logical block address.

17. The computer system of claim 15, wherein the first second-level mapping represents a key-value pair, and the key includes the first logical block address and the values include the first physical block address and a number of contiguous logical data blocks from the first logical block address.

18. The computer system of claim 15, wherein the first second-level B+ tree data structure corresponds to the first snapshot.

19. The computer system of claim 15, wherein the non-transitory computer-readable medium has stored thereon additional instructions that, when executed by the processor, cause the processor to:

identify a second second-level B+ tree data structure corresponding to one of the plurality of snapshots based on the second first-level mapping;

obtain a second second-level mapping based on the second logical block address in the second second-level B+ tree data structure;

obtain a second physical block address based on the second second-level mapping; and access data at the second physical block address.

20. The computer system of claim 15, wherein accessing data comprises accessing data in a log-structured file system (LFS).

* * * * *